(No Model)

J. P. SWOFFORD.
EARTH AUGER.

No. 585,488. Patented June 29, 1897.

Witnesses

Inventor
James P. Swofford
Per
Alexander T. Dowell
Attorneys

UNITED STATES PATENT OFFICE.

JAMES PORTER SWOFFORD, OF JACKSON, MISSISSIPPI.

EARTH-AUGER.

SPECIFICATION forming part of Letters Patent No. 585,488, dated June 29, 1897.

Application filed March 30, 1897. Serial No. 629,973. (No model.)

*To all whom it may concern:*

Be it known that I, JAMES PORTER SWOFFORD, of Jackson, in the county of Hinds and State of Mississippi, have invented certain new and useful Improvements in Earth-Augers; and I hereby declare that the following is a full, clear, and exact description thereof, reference being had to the accompanying drawings, which form part of this specification.

This invention is an improvement in augers for boring wells, post-holes, &c.; and its object is to so construct the auger that all parts thereof are readily detachable, so that they can be replaced or removed and repaired or sharpened with ease, and yet, when put together, will be firm and rigid.

The invention consists in the novel construction and combination of parts constituting the auger shown in the accompanying drawings and hereinafter described and claimed.

Figure 1:
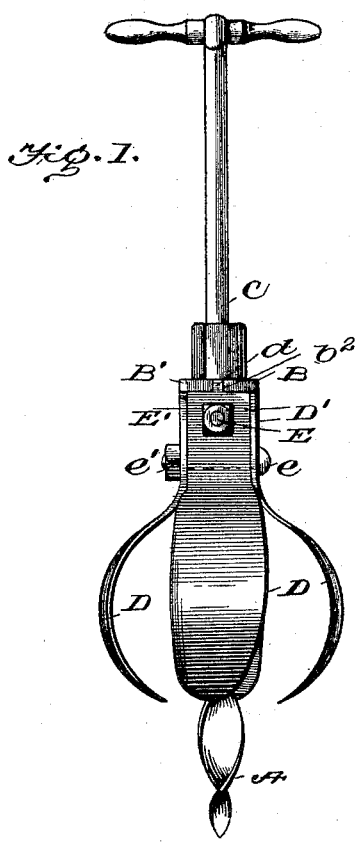
Figure 2:
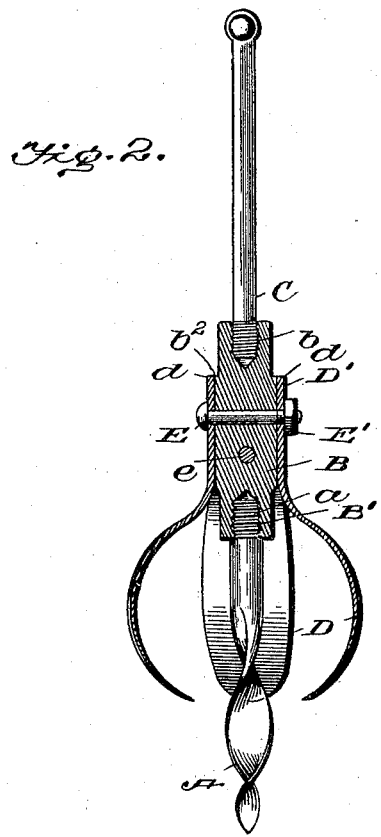
Figure 3:
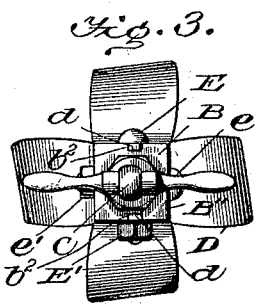
Figure 4:
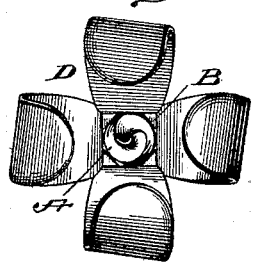

In said drawings, Figure 1 is a side view of the auger. Fig. 2 is a vertical section through the same. Fig. 3 is a top view, and Fig. 4 a bottom view, thereof.

In said drawings, A designates the center twist-bit, provided at top with a threaded shank $a$, adapted to screw into a corresponding socket B' in the lower end of a block B, preferably rectangular or four-sided in cross-section, and having on its upper end a threaded socket $b$, into which the lower end of the handle C is screwed.

D D designate cutters, each having a shank portion D' that will fit against the side of block B. Two of the cutters D are fastened to block B by a bolt E and nut E', said bolt transfixing the block B and shanks of the cutters D, as shown, the single bolt E fastening the opposite cutters D to the block. The other two cutters D are fastened to the other opposite faces of the block B by means of a bolt $e$ and nut $e'$, transfixing the block and shanks, as shown.

On the upper end of each shank D is a central tooth $d$, which fits into a notch $b^2$ in a projecting flange B'' on the upper end of block B and prevents the cutters turning on the fastening-bolts.

Each cutter D below its shank is bowed outwardly, so that the four make a roughly-globular cutter, from and below which the bit A depends, as shown.

The edges of the bowed portions of the cutters should be sharpened, so as to cut into the ground quickly.

The operation and mode of using the device will be readily understood by those familiar with such tools.

It will be readily understood that any or all the cutters can be readily detached, facilitating sharpening and repairing thereof, and that the bit can also be easily detached and replaced at will.

Having thus described my invention, what I therefore claim as new, and desire to secure by Letters Patent thereon, is—

The combination in an earth-auger of cutters D, D, each having a shank portion D' resting against block B, and a tooth $d$, fitting in notch $b^2$ of the projecting flange B''; with twist-bit A, and handle C all arranged and adapted to operate as and for the purpose set forth.

In testimony that I claim the foregoing as my own I affix my signature in presence of two witnesses.

JAMES PORTER SWOFFORD.

In presence of—
 S. R. GRANBERY,
 JOHN ELSASSER.